(12) United States Patent
Nakamura et al.

(10) Patent No.: US 9,760,229 B2
(45) Date of Patent: Sep. 12, 2017

(54) TOUCH SCREEN, TOUCH PANEL, DISPLAY, AND ELECTRONIC EQUIPMENT

(71) Applicant: Mitsubishi Electric Corporation, Tokyo (JP)

(72) Inventors: Tatsuya Nakamura, Tokyo (JP); Takeshi Ono, Tokyo (JP); Takashi Miyayama, Tokyo (JP); Naoki Nakagawa, Tokyo (JP); Masafumi Agari, Tokyo (JP); Tae Orita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 84 days.

(21) Appl. No.: 14/800,278

(22) Filed: Jul. 15, 2015

(65) Prior Publication Data

US 2016/0041651 A1 Feb. 11, 2016

(30) Foreign Application Priority Data

Aug. 11, 2014 (JP) .................................. 2014-163290

(51) Int. Cl.
*G06F 3/044* (2006.01)
*G06F 3/047* (2006.01)
*G06F 3/041* (2006.01)

(52) U.S. Cl.
CPC ............ *G06F 3/044* (2013.01); *G06F 3/0416* (2013.01); *G06F 2203/04107* (2013.01)

(58) Field of Classification Search
CPC ....... G06F 3/044; G06F 3/0412; G06F 3/0416
USPC ....................................................... 345/173
See application file for complete search history.

(56) References Cited

U.S. PATENT DOCUMENTS

| 5,844,506 A * | 12/1998 | Binstead ............... G06F 3/0202 178/19.01 |
| 6,137,427 A | 10/2000 | Binstead |
| 6,452,514 B1 | 9/2002 | Philipp |
| RE40,867 E | 8/2009 | Binstead |

(Continued)

FOREIGN PATENT DOCUMENTS

| JP | H09-197376 A | 7/1997 |
| JP | H09-511086 A | 11/1997 |

(Continued)

*Primary Examiner* — Amare Mengistu
*Assistant Examiner* — Jennifer Zubajlo
(74) *Attorney, Agent, or Firm* — Studebaker & Brackett PC

(57) ABSTRACT

A touch screen according to the present invention includes: a transparent substrate; a plurality of row-direction wirings and a plurality of column-direction wirings provided on the transparent substrate, the row-direction wirings and the column-direction wirings intersecting via an inter-layer insulating film with each other in a stereoscopic view; a plurality of lead-out wirings each provided to be electrically extended from each of first ends of the said row-direction wirings and the column-direction wirings; and a shield wiring provided to surround in a planar view the row-direction wirings, the column-direction wirings, and the lead-out wirings, wherein the row-direction wirings, the column-direction wirings, and the shield wiring have comb-teeth parts which are formed to have comb-teeth shapes such that distances from the shield wiring to the row-direction wirings and the column-direction wirings are small at predetermined parts.

10 Claims, 6 Drawing Sheets

(56) References Cited

U.S. PATENT DOCUMENTS

| | | |
|---|---|---|
| 8,269,744 B2 | 9/2012 | Agari et al. |
| 8,390,598 B2 | 3/2013 | Agari et al. |
| 2010/0060602 A1* | 3/2010 | Agari ................. G06F 3/044 345/173 |
| 2011/0141550 A1* | 6/2011 | Ishida ............. G02F 1/136204 359/296 |
| 2011/0148516 A1* | 6/2011 | Tanaka ................ G09G 3/3685 327/564 |
| 2013/0242485 A1* | 9/2013 | Ohtani .................. G06F 3/041 361/679.01 |

FOREIGN PATENT DOCUMENTS

| | | |
|---|---|---|
| JP | 2000-267137 A | 9/2000 |
| JP | 2003-526831 A | 9/2003 |
| JP | 2010-061502 A | 3/2010 |
| JP | 2011-198208 A | 10/2011 |
| JP | 2012-103761 A | 5/2012 |
| WO | 95/27334 A1 | 10/1995 |
| WO | 00/44018 A1 | 7/2000 |
| WO | 2012/114958 A1 | 2/2012 |

* cited by examiner

TOUCH SCREEN, TOUCH PANEL, DISPLAY, AND ELECTRONIC EQUIPMENT

BACKGROUND OF THE INVENTION

Field of the Invention

The present invention relates to a touch screen, a touch panel equipped with the touch screen, a display and electronic equipment equipped with the touch panel.

Description of the Background Art

A touch panel is a device to detect touch of a pointing body such as a finger and to identify a position coordinate of the touched position on the touch panel, and is receiving attention as one of excellent user interface means. At present, there are various types of touch panels commercially available such as a resistive film type and an electrostatic capacitance type. In general, a touch panel is equipped with a touch screen in which a touch sensor (a sensor for detecting touch) is incorporated, and is equipped with a detection device to identify a position coordinate of a position of the touch, based on a signal input from the touch screen.

As one of electrostatic capacitance touch panels, there is a projected capacitive touch panel (for example, see Japanese Patent Application Laid-Open No. 2012-103761). In a projected capacitive touch panel as described in Japanese Patent Application Laid-Open No. 2012-103761, even if a front surface side of the touch screen having a built-in touch sensor is covered with a protective plate such as a glass plate having a thickness of about several millimeters, touch can be detected. The projected capacitive touch panel is excellent in toughness because it is possible to dispose the protective plate on the front surface side of the touch screen. In addition, even when a user touches with a glove on, the touch can be detected. Further, the touch panel has no movable parts, and therefore has a long service life.

The projected capacitive touch panel is equipped with, as detection wirings for detecting a capacitance for example, a first series of conductor elements formed on a thin dielectric film and a second series of conductor elements formed on the first series of conductor elements with an insulating film therebetween (see Japanese Unexamined Patent Application Publication (Translation of PCT Application) No. H9-511086 (1997), for example). The conductor elements form a plurality of intersection points without electrically touching with each other. In the configuration as described in Japanese Unexamined Patent Application Publication (Translation of PCT Application) No. H9-511086 (1997), a detection circuit detects capacitances formed between a pointing body such as a finger and the first series of conductor elements and the second series of conductor elements, which are the detection wirings; thus, the position coordinate of the position which the pointing body touches is identified. The above-described method of detecting a position coordinate is generally called a self-capacitance detection method.

Alternatively, there is a method of identifying the position coordinate of the touched position by, for example, detecting a change in an electric field, in other words, a mutual capacitance between a plurality of row wirings extendingly provided in a row direction to constitute a first electrode and a plurality of column wirings extendingly provided in a column direction to constitute a second electrode (see Japanese Unexamined Patent Application Publication (Translation of PCT Application) No. 2003-526831, for example). This detection method is generally called a mutual capacitance detection method.

In any of the above self-capacitance type and mutual capacitance type, there is generally employed a method in which, when a plane area (detection cell) separated in a lattice shape by the row wirings and the column wirings is touched by a pointing body such as a finger, a position coordinate of the touched position is identified based on a balance between a detection value for the touched detection cell (sensor block) and a detection value for a detection cell in a vicinity of the sensor block.

Recently, there is realized a configuration in which metal having a low resistance is used to form a mesh as detection wirings and in which, by making use of a property of having a resistance lower than transparent electrodes such as ITO (Indium Tin Oxide), lead-out wirings to be connected to each terminal of the row wirings and the column wiring are connected to only terminal parts on one side of the row wirings and the column wirings (see Japanese Patent Application Laid-Open No. 2010-61502, for example).

There is a problem in such a configuration as described in Japanese Patent Application Laid-Open No. 2010-61502 that the lead-out wirings are connected to only the terminal parts on one side of each of the row wirings and each of the column wirings. The problem is that, when a pointing body (conductor) such as a finger coming close to the touch panel generates an electrostatic discharge, an electric charge is likely to accumulate on the other sides (the sides to which no lead-out wirings are connected) of the each of the row wirings and the each of the column wirings; therefore breakdown is likely to occur between the row-direction wiring and the column-direction wiring on the other sides.

SUMMARY OF THE INVENTION

An object of the present invention is to provide a touch screen, a touch panel, a display, and electronic equipment, in which occurrence of breakdown due to an electrostatic discharge can be reduced.

A touch screen including: a substrate; a plurality of row-direction wirings and a plurality of column-direction wirings both provided on the substrate such that the row-direction wirings and the column-direction wirings cross in a stereoscopic view each other via an insulating film therebetween; a plurality of lead-out wirings each provided to be electrically extended from each of first ends of the row-direction wirings and the column-direction wirings; and a first shield wiring provided to surround in a planar view the row-direction wirings, the column-direction wirings, and the lead-out wirings, wherein each of the row-direction wirings, each of the column-direction wirings, and the first shield wiring include comb-teeth parts formed to have comb-teeth shapes such that distances from the first shield wiring to the row-direction wirings and the column-direction wirings are small at predetermined parts.

According to the present invention, the touch screen includes: a substrate; a plurality of row-direction wirings and a plurality of column-direction wirings both provided on the substrate such that the row-direction wirings and the column-direction wirings cross in a stereoscopic view each other via an insulating film therebetween; a plurality of lead-out wirings each provided to be electrically extended from each of first ends of the row-direction wirings and the column-direction wirings; and a first shield wiring provided to surround in a planar view the row-direction wirings, the column-direction wirings, and the lead-out wirings, wherein each of the row-direction wirings, each of the column-direction wirings, and the first shield wiring include comb-teeth parts formed to have comb-teeth shapes such that distances from the first shield wiring to the row-direction wirings and the column-direction wirings are small at predetermined parts. Thus, it is possible to reduce occurrence of breakdown due to an electrostatic discharge.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the present invention will be described below based on the drawings.

First Preferred Embodiment

Figure 1:
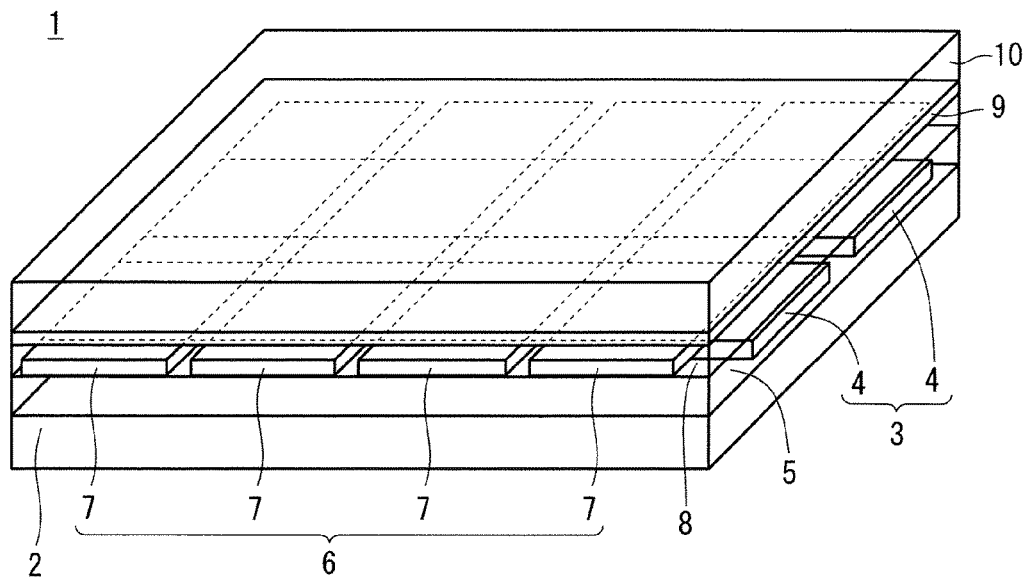
FIG. 1 is a perspective view illustrating an example of a configuration of a touch screen according to a first preferred embodiment of the present invention.

FIG. 1 is a perspective view illustrating an example of a configuration of a touch screen 1 according to a first preferred embodiment of the present invention. The touch screen 1 is a projected capacitive touch screen.

As the lowest surface layer of the touch screen 1, there is provided a transparent substrate 2 made of transparent glass material or transparent resin. On the transparent substrate 2, a lower electrode 3 is formed, and an inter-layer insulating film 5 is formed to cover the lower electrode 3. The inter-layer insulating film 5 is a transparent (having transparency) insulating film such as a silicon nitride film or a silicon oxide film.

On the inter-layer insulating film 5, an upper electrode 6 is formed, and a protective film 8 is formed to cover the upper electrode 6. The protective film 8 is, similarly to the inter-layer insulating film 5, a transparent insulating film such as a silicon nitride film or a silicon oxide film.

On the protective film 8 is provided (attached) a polarizer 9 for a liquid crystal display on which the touch screen 1 is to be mounted. In addition, on the polarizer 9 is provided (adhesively stuck) a transparent substrate 10 made of transparent glass material or transparent resin so as to protect the touch screen 1.

The lower electrode 3 has a plurality of row-direction wirings 4 made of transparent wiring material such as ITO or made of metal wiring material such as aluminum and copper. In addition, the upper electrode 6 has a plurality of column-direction wirings 7 made of, similarly to the row-direction wirings 4, transparent wiring material such as ITO or made of metal wiring material such as aluminum and copper. The plurality of row-direction wirings 4 and the plurality of column-direction wirings 7 intersect via the inter-layer insulating film 5 with each other, in a stereoscopic view, on the transparent substrate 2.

In the first preferred embodiment, the row-direction wirings 4 and the column-direction wirings 7 are formed in a laminated structure of an aluminum-based alloy layer and a layer of nitride of the alloy; therefore, the wiring resistance can be small, and an optical reflectance of a detectable area can be reduced. Here, the detectable area is an area in which it can be detected that the touch screen 1 is touched by a pointing body such as a finger (to be described later in detail).

Note that, in the present first preferred embodiment, the column-direction wirings 7 are disposed on a layer higher than the row-direction wirings 4; however, the row-direction wirings 4 may be disposed on a layer higher than the column-direction wirings 7. Alternatively, it may be possible that the row-direction wirings 4 and the column-direction wirings 7 are disposed on the same layer and that the inter-layer insulating film 5 is disposed, for electrical separation, only on the parts on which the row-direction wirings 4 and the column-direction wirings 7 overlap (intersect with) each other in a planar view.

The row-direction wirings 4 and the column-direction wirings 7 are formed in a multilayer structure of an aluminum-based alloy layer and a layer of nitride of the alloy; however, the present embodiment is not limited to this structure. For example, the column-direction wirings 7 may be formed in a multilayer structure of an aluminum-based alloy layer and a layer of nitride of the alloy, and the row-direction wirings 4 may be made of transparent wiring material such as ITO.

A user performs an operation by touching the transparent substrate 10 as a surface of the touch screen 1, with a pointing body such as a finger. When the pointing body comes in contact with (touches) the transparent substrate 10, a capacitive coupling (touch capacitance) is formed between the pointing body and the row-direction wirings 4 or the column-direction wirings 7. In the case of the mutual capacitance type, it is possible to identify what position in the detectable area is touched, by detecting the change, caused by the generation of the touch capacitance, in the mutual capacitances between the upper electrode 6 and the lower electrode 3 (specifically, between the column-direction wirings 7 and the row-direction wirings 4).

Figure 2:
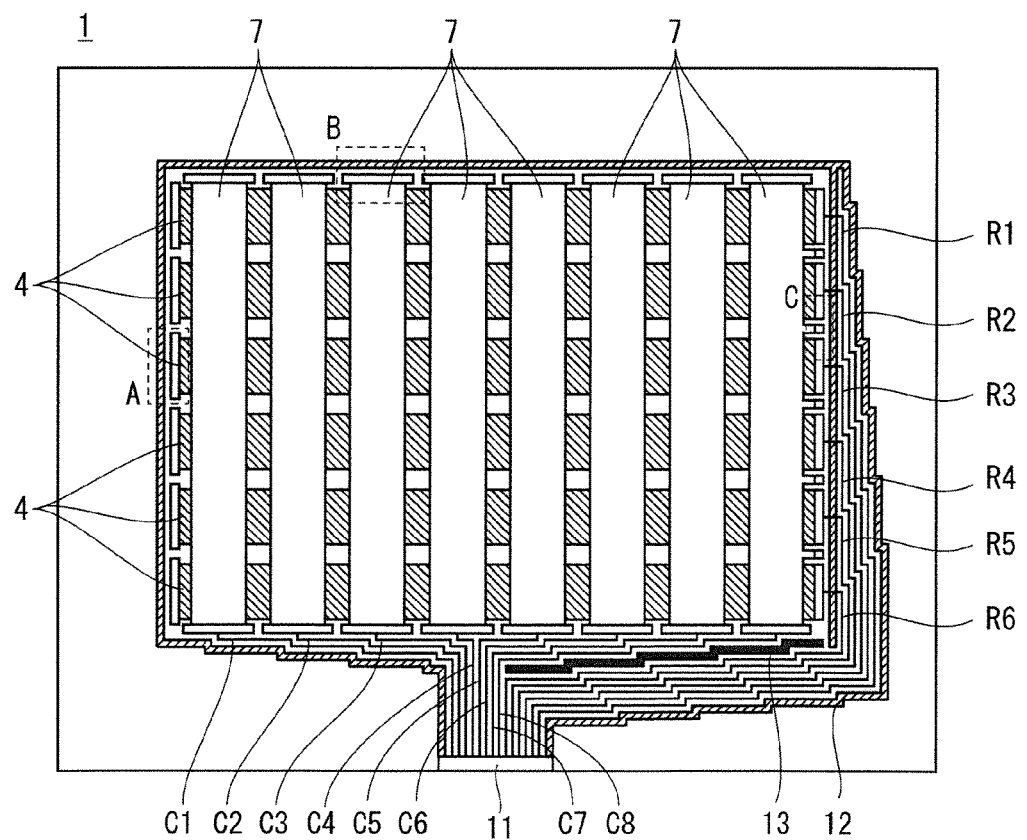
FIG. 2 is a plan view illustrating an example of a configuration of the touch screen according to the first preferred embodiment of the present invention.

FIG. 2 is a plan view illustrating an example of a configuration of the touch screen 1.

The detectable area of the touch screen 1 is a matrix area constituted of the plurality of row-direction wirings 4 extendingly provided in the row direction (in the lateral direction on the page) and the plurality of column-direction wirings 7 extendingly provided in the column direction (in the vertical direction on the sheet) on the proximal side of the row-direction wirings 4.

Each of the row-direction wirings 4 is connected, through each of the lead-out wirings R1 to R6, to a terminal 11 for electrical connection to external wirings. Each of the column-direction wirings 7 is connected to a terminal 11 through each of the lead-out wirings C1 to C8. In addition, between the lead-out wiring R6 and the lead-out wiring C8, a dummy lead-out wiring 13 is provided.

The lead-out wirings R1 to R6 and the lead-out wirings C1 to C8 are densely disposed on an outer peripheral side of the detectable area. At this time, the lead-out wiring R6, which is the shortest in the lead-out wirings R1 to R6, is disposed at the innermost position, and the other lead-out wirings R1 to R5 are arranged along the lead-out wiring R6. In addition, regarding the lead-out wirings C1 to C8, the lead-out wiring C4, which is the shortest, is used as a reference, and the other lead-out wirings C1 to C3 and C5 to C8 are arranged along the lead-out wiring C4.

Since the lead-out wirings R1 to R6 and the lead-out wirings C1 to C8 are densely arranged on the outer peripheral side of the detectable area as described above, it is possible to reduce fringe capacitances formed between the display on which the touch screen 1 is mounted and the lead-out wirings except the most outer lead-out wiring R1 and the lead-out wiring C1 (the lead-out wirings R2 to R6 and the lead-out wirings C2 to C8).

In addition, on the outside of the lead-out wiring R1 and the lead-out wiring C1, there is provided a shield wiring 12 (first shield wiring) to which a ground potential is input. Specifically, the shield wiring 12 is disposed to surround, in a planar view, the row-direction wirings 4, the column-direction wirings 7, and the lead-out wirings R1 to R6 and C1 to C8. By providing the shield wiring 12, it is possible to reduce a fringe capacitance formed between the display on which the touch screen 1 is mounted, and the lead-out wiring R1 and the lead-out wiring C1. Further, a shield wiring 12 (second shield wiring) is disposed along the side of first ends of the row-direction wirings 4. In other words, the second shield wiring is branched off from the first shield wiring and is disposed along the first ends of row-direction wirings 4.

Since the lead-out wirings R1 and R6 and the lead-out wirings C1 to C8 are arranged as described above, it is possible to reduce influence, on the lead-out wirings, of an electromagnetic noise generated in a display on which the touch screen 1 is mounted.

Figure 3:
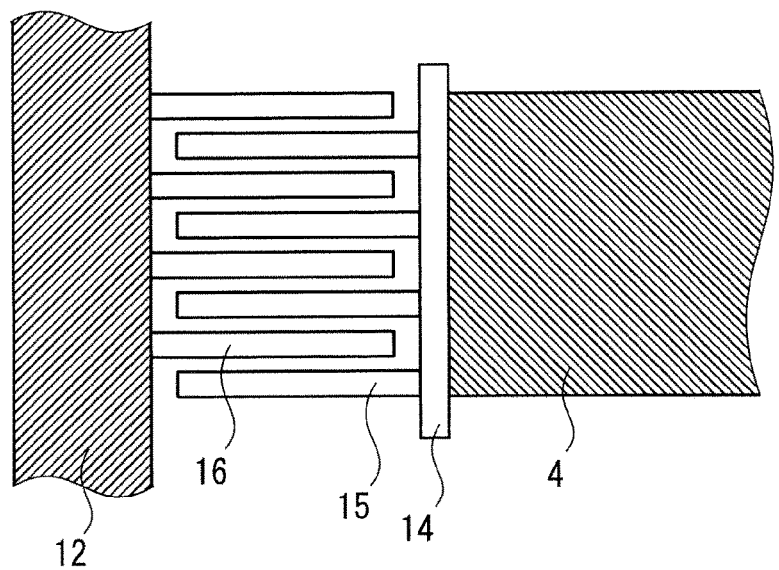
FIGS. 3, 4, and 5 are enlarged views of an area A, an area B, and an area C of FIG. 2, respectively, according to the first preferred embodiment of the present invention.

FIG. 3 is an enlarged view of the area A of FIG. 2. Note that, FIG. 3 illustrates one of the row-direction wirings 4 as an example; however, other row-direction wirings 4 have the same structure.

On termination parts 14 (end parts to which the lead-out wiring R1 and R6 are not connected) of the row-direction wirings 4, comb-teeth parts 15 having a comb-teeth shape are formed toward the shield wiring 12. In addition, on the shield wiring 12, comb-teeth parts 16 having a comb-teeth shape are formed at a position opposing, in a planar view, to the comb-teeth parts 15. The comb-teeth parts 15 and the comb-teeth parts 16 are arranged, in a planar view, alternately with but not in contact with each other, and are close to each other, thereby forming a capacitance. The row-direction wiring 4 and the shield wiring 12 are formed on different layers.

As described above, when there are provided parts (specifically, the comb-teeth parts 15 and comb-teeth parts 16) at which the row-direction wirings 4 and the shield wiring 12 are partially close to each other, convergence of an electrostatic discharge is increased at the termination part 14 so that the potential is not likely to increase in the case that an electrostatic discharge is caused by a pointing body (conductor) such as a finger coming close to the touch screen 1; thus, a voltage difference between the row-direction wiring 4 and the column-direction wiring 7 is small, thereby reducing breakdown.

Figure 4:
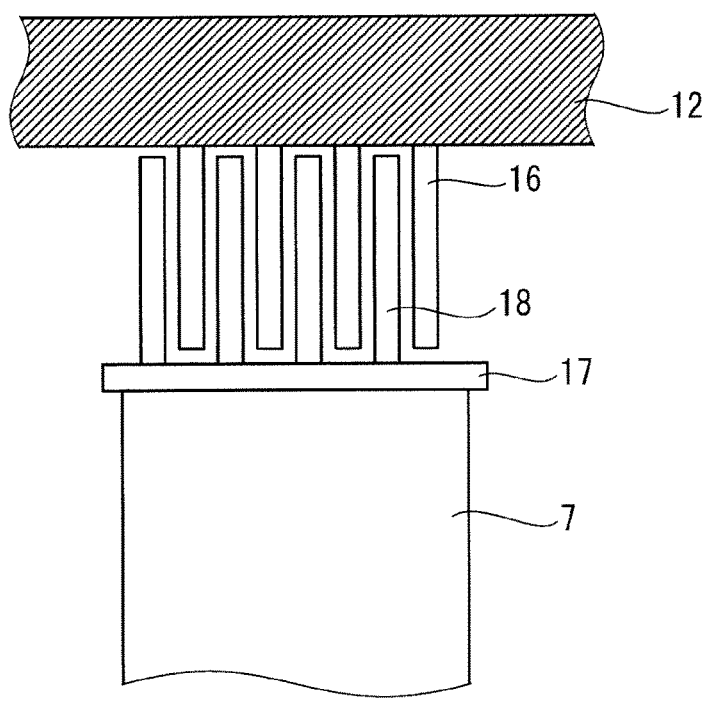

FIG. 4 is an enlarged view of the area B of FIG. 2. Note that, FIG. 4 illustrates one of the column-direction wirings 7 as an example; however, other column-direction wirings 7 are the same structure.

On termination parts 17 (end parts to which the lead-out wiring C1 and C8 are not connected) of the column-direction wirings 7, comb-teeth parts 18 having a comb-teeth shape are formed toward the shield wiring 12. In addition, on the shield wiring 12, comb-teeth parts 16 are formed at positions opposing, in a planar view, to the comb-teeth parts 18. The comb-teeth parts 18 and the comb-teeth parts 16 are arranged, in a planar view, alternately with but not in contact with each other, and are close to each other, thereby forming a capacitance. The column-direction wiring 7 and the shield wiring 12 are formed on the same layer.

As described above, when there are provided parts (specifically, the comb-teeth parts 18 and comb-teeth parts 16) at which the column-direction wirings 7 and the shield wiring 12 are partially close to each other, convergence of an electrostatic discharge is increased at the termination parts 17 so that the potential is not likely to increase in the case that an electrostatic discharge is caused by a pointing body (conductor) such as a finger coming close to the touch screen 1; thus, a voltage difference between the row-direction wiring 4 and the column-direction wiring 7 is small, thereby reducing breakdown.

Figure 5:
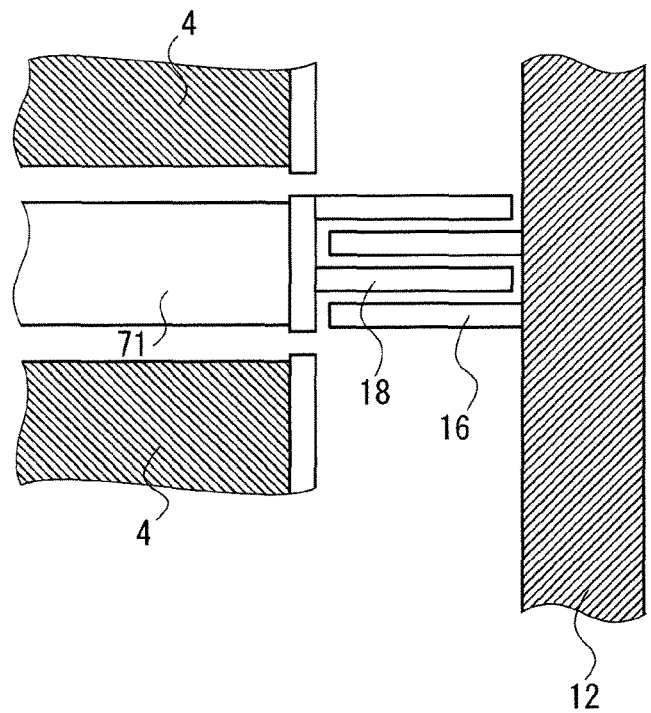

FIG. 5 is an enlarged view of the area C of FIG. 2. Note that, FIG. 5 illustrates one of the column-direction wirings 7 as an example.

On one column-direction wiring 7 of the column-direction wirings 7 which is closest to first ends (the ends to which the lead-out wirings R1 to R6 are connected) of the row-direction wirings 4, a plurality of extension parts 71 are formed alternately, in a planar view, with the first ends of the row-direction wiring 4. On the extension parts 71, comb-teeth parts 18 are provided toward the shield wiring 12; and on the shield wiring 12, comb-teeth parts 16 are provided at positions opposing, in a planar view, to the comb-teeth parts 18. The comb-teeth parts 18 and the comb-teeth parts 16 are arranged, in a planar view, alternately with and not in contact with each other, and are close to each other, thereby forming a capacitance. The column-direction wiring 7 and the shield wiring 12 are formed on the same layer.

As described above, when there are provided parts (specifically, the comb-teeth parts 18 and comb-teeth parts 16) at which the column-direction wirings 7 and the shield wiring 12 are partially close to each other, convergence of an electrostatic discharge is increased at the column-direction wirings 7 which intersect with the row-direction wirings 4 so that the potential is not likely to increase in the case that an electrostatic discharge is caused by a pointing body (conductor) such as a finger coming close to the touch screen 1;

thus, a voltage difference between the row-direction wiring 4 and the column-direction wiring 7 is small, thereby reducing breakdown.

Next a detailed configuration of the row-direction wirings 4 and the column-direction wirings 7 will be described with reference to FIG. 6.

Figure 6:
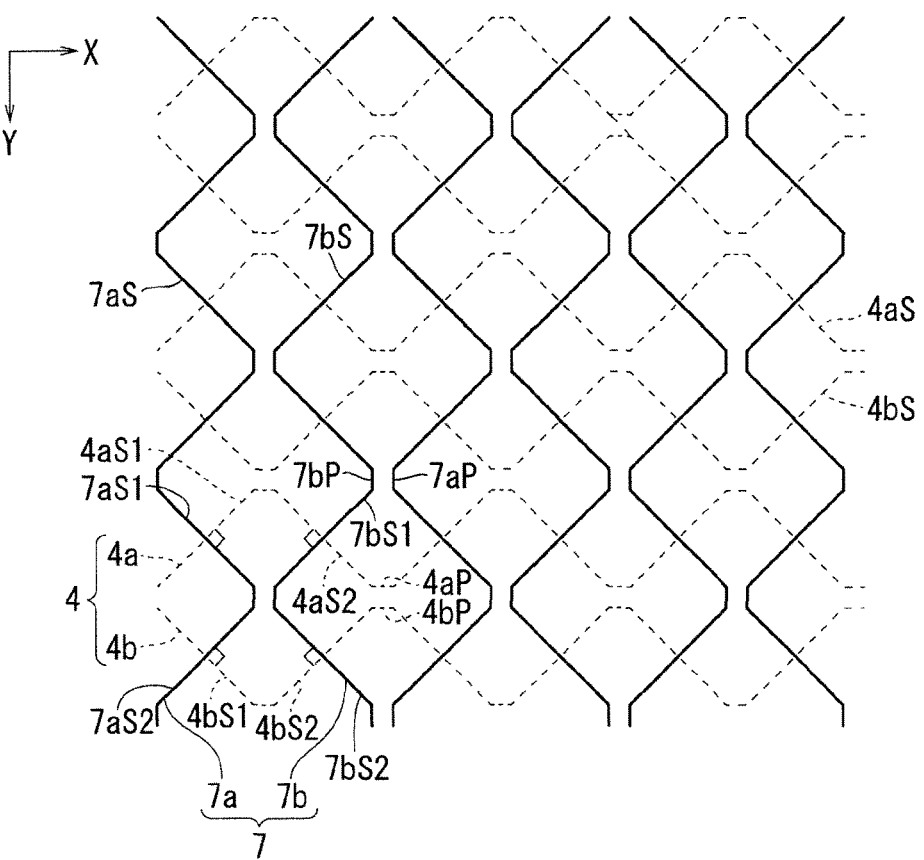
FIG. 6 is a diagram for describing an example of a detailed configuration of row-direction wirings and column-direction wirings according to the first preferred embodiment of the present invention.

As illustrated in FIG. 6, each of the column-direction wirings 7 is constituted of a pair of (1) a first metal wiring 7a in which first inclined parts 7aS inclined, by an inclination angle of 45°, from the column direction y and first parallel parts 7aP being parallel to the column direction y and being connected to the first inclined parts 7aS are repeatedly provided in a zig-zag manner along the column direction y and (2) a second metal wiring 7b which has a configuration line-symmetric to the first metal wiring 7a about the column direction y.

Similarly, each of the row-direction wirings 4 is constituted of a pair of (3) a third metal wiring 4a in which a second inclined parts 4aS inclined, by an inclination angle of 45°, from the row-direction x and second parallel parts 4aP being parallel to the row direction x and being connected to the second inclined parts 4aS are repeatedly provided in a zig-zag manner along the row direction x and (4) a fourth metal wiring 4b which has a configuration line-symmetric to the third metal wiring 4a about the row direction x.

In addition, the following positional relationship is established in areas in each of which any one column-direction wiring 7 of the plurality of column-direction wirings 7 and any one row-direction wiring 4 of the plurality of row-direction wirings 4 intersect with each other in a grade-separated manner.

Specifically, one inclined part 7aS1 of the two first inclined parts 7aS of the first metal wiring 7a in each area intersects without exception, at the midpoint (central part) thereof, with one inclined part 4aS1 of the two second inclined parts 4aS of the third metal wiring 4a in the area, at the midpoint (central part) thereof, in a grade-separated manner. The other inclined part 7aS2 of the two first inclined parts 7aS of the first metal wiring 7a in the area intersects without exception, at the midpoint (central part) thereof, with one inclined part 4bS1 of the two second inclined parts 4bS of the fourth metal wiring 4b in the area, at the midpoint (central part) thereof, in a grade-separated manner.

Further, one inclined part 7bS1 of the two first inclined parts 7bS of the second metal wiring 7b in the area intersects without exception, at the midpoint (central part) thereof, with the other inclined part 4aS2 of the two second inclined parts 4aS of the third metal wiring 4a in the area, at the midpoint (central part) thereof, in a grade-separated manner. The other inclined part 7bS2 of the two first inclined parts 7bS of the second metal wiring 7b in the area intersects without exception, at the midpoint (central part) thereof, with the other inclined part 4bS2 of the two second inclined parts 4bS of the fourth metal wiring 4b in the area, at the midpoint (central part) thereof, in a grade-separated manner.

By setting the orthogonal relations between the inclined parts as described above, lengths, along the row direction x, of the parallel parts 7aP, 7bP, 4aP, and 4bP in the areas are minimized.

By employing the configuration of FIG. 6, a value of the parasitic capacitance formed between each of the column-direction wirings 7 and each of the row-direction wirings 4 can be minimized. In addition, since the all area, in a planar view, of the parts on which neither the column-direction wiring 7 nor the row-direction wiring 4 exists can be significantly smaller than in the case that the configuration of FIG. 6 is not employed, it is possible to uniformly detect, in each area, the touch capacitance constituted of the capacitance formed between a pointing body such as a finger and each of the column-direction wirings 7 and the capacitance between the pointing body and each of the row-direction wirings 4.

When the display panel is mounted on the touch screen 1 such that each of the row direction x and the column direction y of the touch screen 1 employing the configuration of FIG. 6 is parallel to each of the row direction and the column direction of the pixel pattern of the display panel (for example, LCD panel) which is mounted on the touch screen 1, the first metal wirings 7a, the second metal wirings 7b, the third metal wirings 4a, and the fourth metal wirings 4b, each of which are each of the zig-zag patterns of the column-direction wirings 7 and the row-direction wirings 4, are disposed in the oblique direction which is 45° inclined from each arrangement direction of the row direction and the column direction of the pixel pattern. Therefore, a part of each pixel is evenly covered, and as a result, a transmittance of the touch screen 1 when display light emitted from the display panel passes through the touch screen 1 is averaged, whereby a moire effect can be reduced.

By forming the row-direction wirings 4 and the column-direction wirings 7 to be mesh-shaped wirings as illustrated in FIG. 6, the fewer wiring area can cover the wider detectable area.

Note that the material and the shape of the row-direction wirings 4 and the column-direction wiring 7 are not limited to the above. As a material for the row-direction wirings 4 and the column-direction wirings 7, it is possible to use transparent conductive material such as ITO and graphene or metal material such as aluminum, chromium, copper, and silver. Alternatively, it is possible to use an alloy of aluminum, chromium, copper, silver, or other material or a multilayer structure made of such an alloy and aluminum nitride or other material. Further, the width of the conductive wiring and the mesh spacing may be different from the above values, depending on the purpose of the touch screen.

Here, in order to confirm the effect of the present first preferred embodiment, an electrostatic discharge test was conducted with respect to the touch screen 1 (see FIG. 1) according to the present first preferred embodiment and, as a comparative example, a touch screen which does not has the comb-teeth parts 15 of the row-direction wirings 4 or the comb-teeth parts 18 of the column-direction wirings 7, under the condition that the transparent substrate 10 is made of glass material having a thickness of 1.0 mm, the discharge capacitor is 330 pF, and the discharge resistor is 330Ω. As a result of the test, in the touch screen of the comparative example, a breakdown was observed, at 12 kV, inside the sensor (inside the above-described area) in the vicinity of the end part opposite to the end to which the lead-out wiring of the row-direction wiring was connected. In contrast, in the touch screen 1 according to the present first preferred embodiment, although the voltage was set higher than 12 kV, any breakdown was not observed; therefore, it can be confirmed that a breakdown was less likely to occur in the touch screen 1 according to the present first preferred embodiment.

Figure 7:
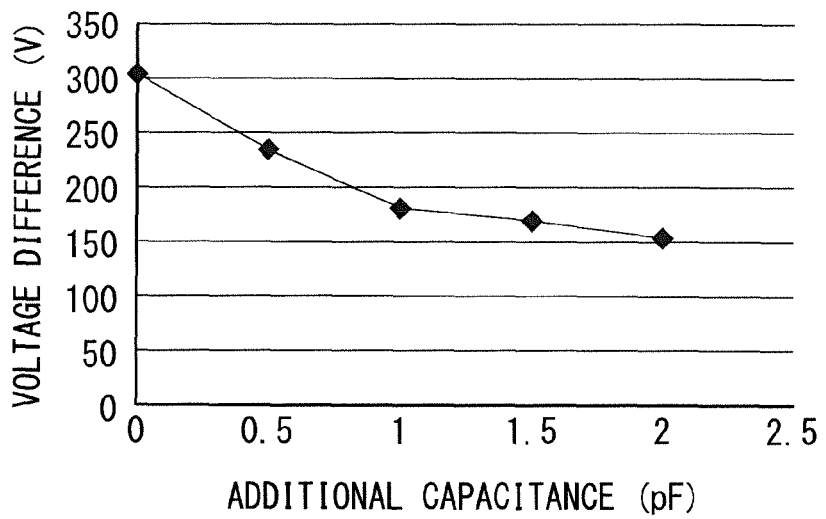
FIG. 7 is a diagram illustrating a relationship between a capacitance between a row-direction wiring and a column-direction wiring, and the shield wiring and a voltage difference between the row-direction wiring and the column-direction wiring, according to the first preferred embodiment of the present invention.

FIG. 7 is a diagram illustrating the relationship between the capacitances between each of the row-direction wirings 4 and the column-direction wirings 7, and the shield wiring 12 and the voltage difference between the row-direction wiring 4 and the column-direction wiring 7, at the time of the electrostatic discharge (ESD). In FIG. 7, the horizontal axis represents the capacitance (additional capacitance) formed between the comb-teeth parts 15 of the row-direction wiring 4 and the comb-teeth parts 16 of the shield wiring 12 and the capacitance (additional capacitance) formed between the comb-teeth parts 18 of the column-direction wiring 7 and the comb-teeth parts 16 of the shield wiring 12. The vertical axis represents the voltage difference between the row-direction wiring 4 and the column-direction wiring 7.

As illustrated in FIG. 7, it is understood that as the additional capacitance increases (in other words, as the distance between the comb-teeth parts 15 and the comb-teeth parts 16 and the distance between the comb-teeth parts 18 and the comb-teeth parts 16 decreases), the voltage difference between the row-direction wiring 4 and the column-direction wiring 7 decreases.

Figure 8:
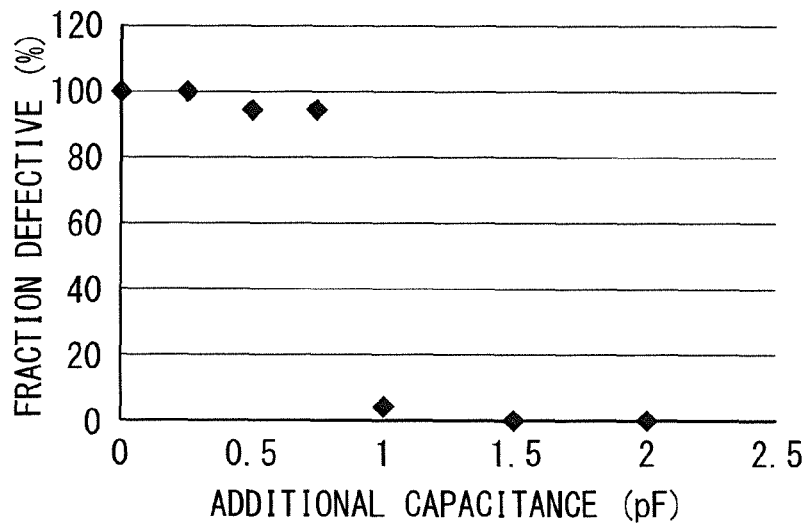
FIG. 8 is a diagram illustrating a relationship between a capacitance between a row-direction wiring, a column-direction wiring, and the shield wiring and a fraction defective, according to the first preferred embodiment of the present invention.

FIG. 8 is a diagram illustrating the relationship between the capacitances between each of the row-direction wiring 4 and the column-direction wiring 7 and the shield wiring 12 and a fraction defective. In FIG. 8, the horizontal axis represents the capacitance (additional capacitance) formed between the comb-teeth parts 15 of the row-direction wiring 4 and the comb-teeth parts 16 of the shield wiring 12 and the capacitance (additional capacitance) formed between the comb-teeth parts 18 of the column-direction wiring 7 and the comb-teeth parts 16 of the shield wiring 12. The vertical axis represents the fraction defective of the touch screen 1. Here, the fraction defective of the touch screen 1 represents the percentage of the touch screen 1 which is defective (does not function as a touch screen).

As illustrated in FIG. 8, it is understood that when the additional capacitance is 1 pF or more, the fraction defective is remarkably low. This shows that the capacitance formed between the comb-teeth parts 15 and the comb-teeth parts 16 and the capacitance formed between the comb-teeth parts 18 and the comb-teeth parts 16 are preferably 1 pF or more.

In view of the above, according to the present first preferred embodiment, there can be provided a highly reliable touch screen in which, even if an electrostatic discharge is caused by a pointing body (conductor) coming close to the touch screen, occurrence of breakdown due to the electrostatic discharge is reduced.

Figure 9:
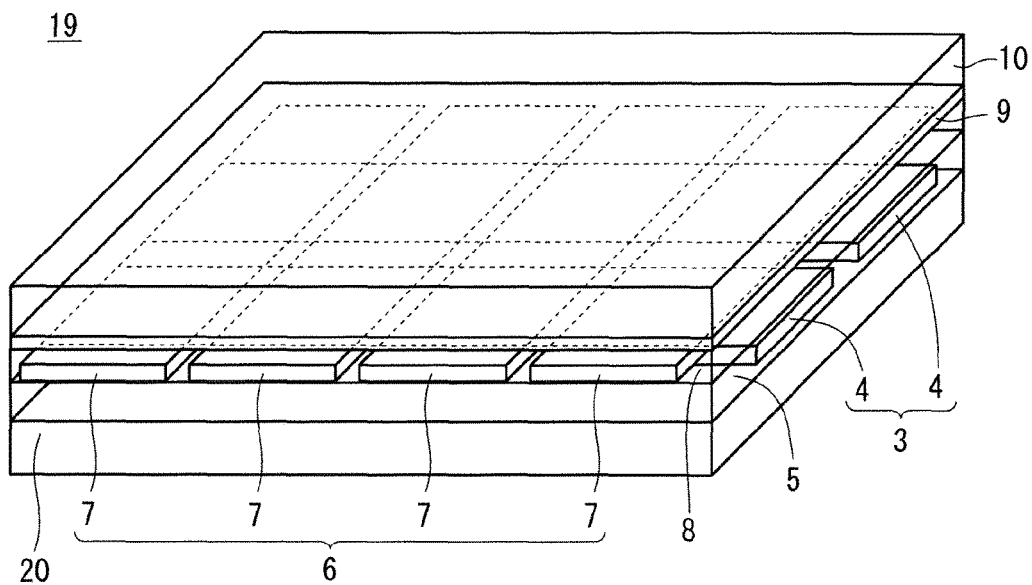
FIGS. 9 and 10 are perspective views each illustrating an example of another configuration of the touch screen according to the first preferred embodiment of the present invention.

Note that, the transparent substrate 2 shown in FIG. 1 may be a color filter substrate for a liquid crystal display. FIG. 9 is a perspective view illustrating a configuration of a touch screen 19. The touch screen 19 is characterized in that the transparent substrate 2 of FIG. 1 is replaced by a color filter substrate 20. The other part of the configuration is the same as in FIG. 1. By employing the configuration illustrated in FIG. 9, the transparent substrate of the touch screen doubles as the color filter substrate for a liquid crystal display; therefore, when the touch screen 19 is mounted on a liquid crystal display, the overall thickness can be reduced.

Figure 10:
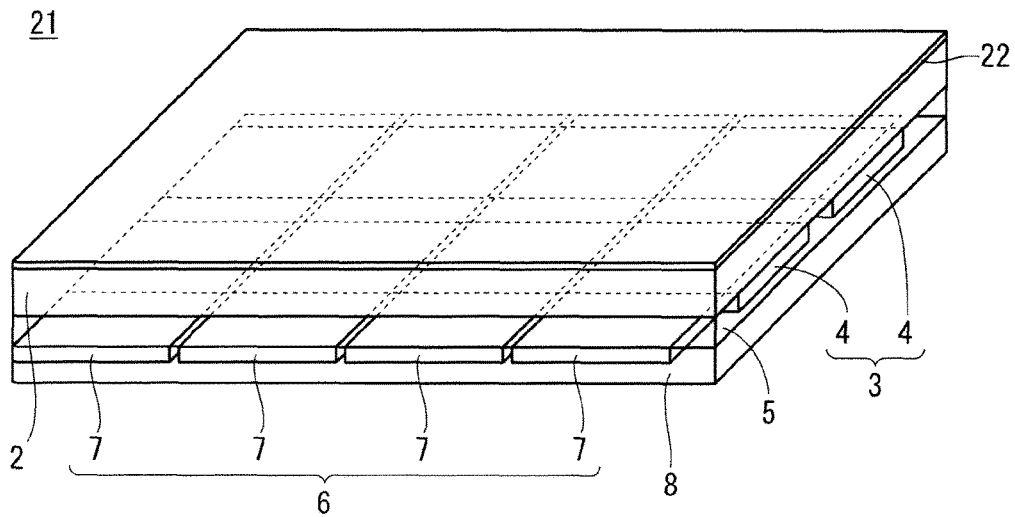

Alternatively, it may be possible that a polarizer 22 is provided (attached), like the touch screen 21 illustrated in FIG. 10, on the back side of the transparent substrate 2 of the touch screen 1 illustrated in FIG. 1 and that the touch screen 21 may be mounted on the liquid crystal display such that the polarizer 22 side is to be used as a display surface side. In this case, the transparent substrate 2 plays a role in protecting the touch screen 21, and at the same time, the transparent substrate 10 illustrated in FIG. 1 can be removed, whereby when the touch screen 21 is mounted on the liquid crystal display, the overall thickness can be reduced.

Second Preferred Embodiment

In the first preferred embodiment, the description is made on the case that the comb-teeth parts 15 provided on the row-direction wiring 4 and the comb-teeth parts 16 provided on the shield wiring 12 are arranged alternately and apart from each other in a planar view.

A second preferred embodiment of the present invention is characterized in that the comb-teeth parts 15 provided on the row-direction wiring 4 and the comb-teeth parts 16 provided on the shield wiring 12 are arranged to overlap each other in a planar view.

Since a configuration of the touch screen according to the present second preferred embodiment is similar to the configuration of the first preferred embodiment (FIGS. 1 and 2), the description will not be repeated.

Note that, in the present second preferred embodiment, in the same manner as the first preferred embodiment (see FIGS. 1 and 2), the row-direction wirings 4 are formed as the lower electrode 3, and the column-direction wirings 7 are formed as the upper electrode 6. Further, the shield wiring 12 is formed on the same layer as the column-direction wirings 7 (the upper electrode 6).

In addition, the row-direction wirings 4 are set longer than the column-direction wirings 7. By this configuration, the end parts, of the row-direction wirings 4, to which the lead-out wirings R1 to R6 are not connected, are likely to be affected by wiring resistances so that electric charges are likely to be accumulated.

Figure 11:
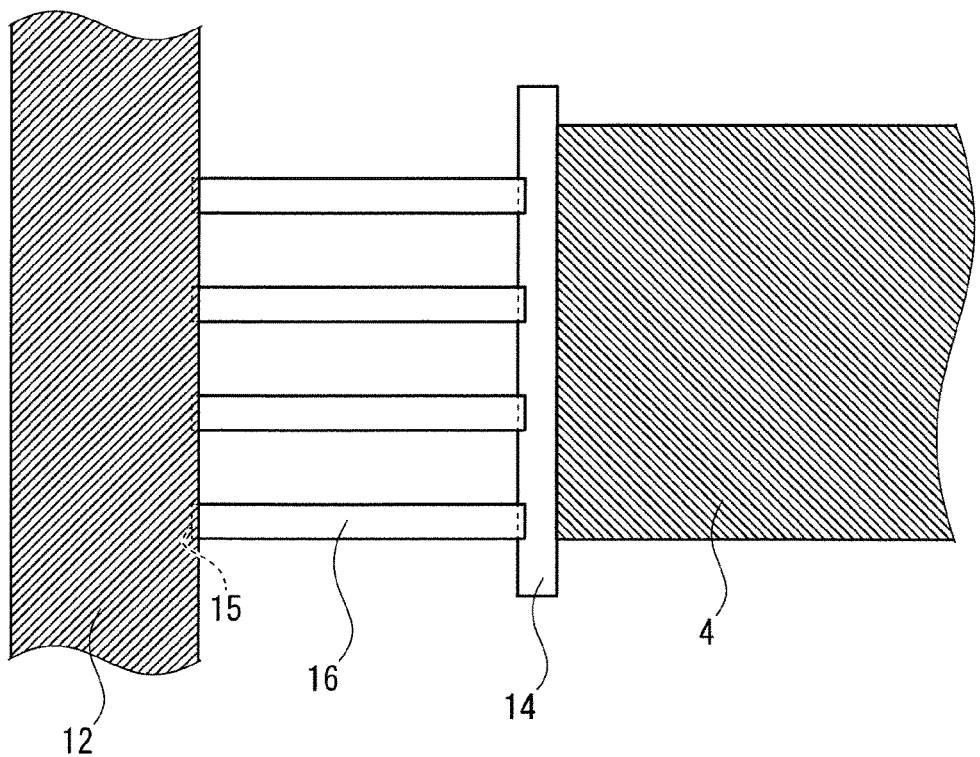
FIG. 11 is an enlarged view of an area A of FIG. 2 according to a second preferred embodiment of the present invention.

FIG. 11 illustrates an enlarged view of the area A in the case that FIG. 2 is taken as the touch screen 1 according to the present second preferred embodiment. Note that, FIG. 11 illustrates one row-direction wiring 4 as an example; however, other row-direction wirings 4 are the same.

On a termination part 14 of the row-direction wiring 4, only one comb-teeth part 15 is provided toward the shield wiring 12. Further, on the shield wiring 12, a comb-teeth part 16 is provided at a position facing the comb-teeth part 15. The comb-teeth part 15 and the comb-teeth part 16 are close to each other to form a capacitance and are arranged to overlap each other in a planar view.

Note that, since the areas B and C of FIG. 2 are the same as in the first preferred embodiment (see FIGS. 4 and 5), description will not be repeated here.

Further, since the detailed configurations of the row-direction wirings 4 and the column-direction wirings 7 are the same as in the first preferred embodiment, description will not be repeated here.

Here, in order to confirm the effect of the present second preferred embodiment, an electrostatic discharge test was conducted with respect to the touch screen according to the present second preferred embodiment and, as a comparative example, the touch screen according to the first preferred embodiment under the condition that the transparent substrate 10 is made of glass material having a thickness of 1.0 mm, the discharge capacitor is 330 pF, and the discharge resistor is 330Ω. As a result of the test, in the touch screen of the comparative example (the present first preferred embodiment), a breakdown was observed, at 20 kV, inside the sensor in the vicinity of the end part opposite to the end to which the lead-out wiring of the row-direction wiring was connected. In contrast, in the touch screen according to the present second preferred embodiment, although the voltage was set higher than 20 kV, any breakdown was not observed; therefore, a breakdown was much less likely to occur in the touch screen 1 according to the present second preferred embodiment.

In view of the above, according to the present second preferred embodiment, the distance (gap) between the comb-teeth part 15 and the comb-teeth part 16 is smaller than in the first preferred embodiment, whereby the electric charge accumulated on the row-direction wiring moves more easily toward the shield wiring. Therefore, there can be provided a highly reliable touch screen in which, even if an electrostatic discharge is caused by a pointing body (conductor) coming close to the touch screen, occurrence of breakdown due to the electrostatic discharge is reduced.

Note that, the above description is given taking as an example the case of using the touch screen 1 illustrated in FIG. 1; however, the same advantageous effect can be obtained even in the case of the touch screen 19 illustrated in FIG. 9 or the touch screen 21 illustrated in FIG. 10.

Third Preferred Embodiment

Figure 12:
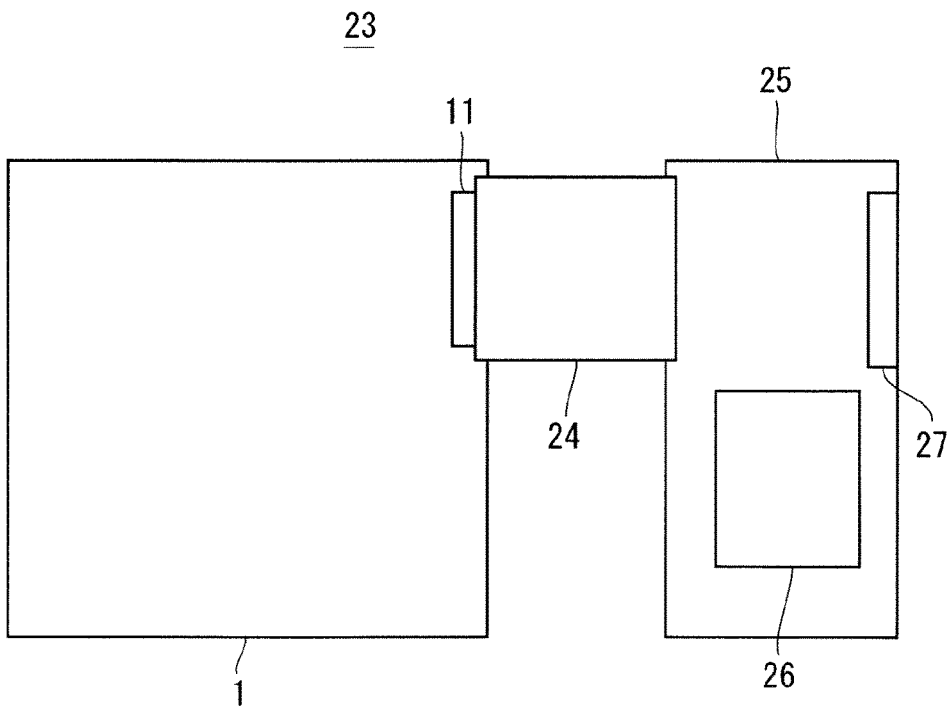
FIG. 12 is a plan view schematically illustrating an example of a configuration of a touch panel according to a third preferred embodiment of the present invention.

FIG. 12 is a plan view schematically illustrating an example of a configuration of a touch panel 23 according to a third preferred embodiment of the present invention. The touch panel 23 is equipped with a touch screen 1 according to the first preferred embodiment illustrated in FIG. 1, a flexible printed circuit board 24, and a controller substrate 25.

To a terminal 11 of the touch screen 1 is connected the flexible printed circuit board 24 which has a terminal (terminal corresponding to the terminal 11) and is mounted by using an anisotropic conductive film or the like. By electrically connecting the column-direction wirings 7 and the row-direction wirings 4 of the touch screen 1 to the controller substrate 25 through the flexible printed circuit board 24, the touch screen 1 functions as a major component of the touch panel 23.

On the controller substrate 25 is mounted a detection processing circuit 26 (touch-position detection circuit). The detection processing circuit 26 detects, by applying a signal voltage, a touch capacitance constituted of a capacitance formed between a pointing body and the row-direction wiring 4 or the column-direction wiring 7; and based on a result of the detection, the detection processing circuit 26 performs a calculation process of a touch position (position coordinate) of the pointing body on the touch screen 1. In other words, the detection processing circuit 26 detects the position, on the touch screen 1, pointed by the pointing body, based on the capacitance between the pointing body pointing the touch screen 1 and the row-direction wiring 4 or the column-direction wiring 7.

The detection processing circuit 26 may employ a detection logic according to a projected capacitance method. In addition, the controller substrate 25 is equipped with an external connection terminal 27 for outputting the touch position (position coordinate) calculated by the detection processing circuit 26 to an external processing device.

In view of the above, according to the present third preferred embodiment, since the touch panel 23 is equipped with the touch screen 1 (see FIG. 1) according to the first preferred embodiment, it is possible to obtain the touch panel 23 in which deterioration, in contrast of a video or the like, due to a breakdown caused by an electrostatic discharge in the touch screen 1 is reduced in the case that the touch panel 23 is mounted on a liquid crystal display.

Note that, the above description is given on the case that the touch screen according to the first preferred embodiment is used; however, the present invention is not limited to the above. For example, the same advantageous effect can be obtained even in the case of using the touch screen according to the second preferred embodiment, the touch screen 19 illustrated in FIG. 9, or the touch screen 21 illustrated in FIG. 10.

The detection processing circuit 26 does not need to be mounted on the controller substrate 25, but may be mounted on the transparent substrate 2 of the touch screen 1.

Fourth Preferred Embodiment

A display according to a fourth preferred embodiment of the present invention is characterized by including the touch panel 23 (see FIG. 12) according to the third preferred embodiment and a liquid crystal display element (LCD) (not shown) capable of displaying information.

The touch panel 23 is disposed closer to a user than a display screen of the liquid crystal display element. In other words, the liquid crystal display element is disposed on the side, of the touch panel 23, opposite to the side on which pointing is performed on the touch screen. This configuration realizes a display having a touch panel which has a function of detecting a touch position pointed by a user.

In view of the above, according to the present fourth preferred embodiment, it is possible to obtain a display having a projected capacitance touch panel in which deterioration in contrast is reduced and which has excellent visibility.

Fifth Preferred Embodiment

An electronic equipment according to a fifth preferred embodiment of the present invention is characterized by including the touch panel 23 (see FIG. 12) according to the third preferred embodiment and a signal processing element (not shown) (electronic processor), which is an electronic element.

The signal processing element is fed with a signal (a touch position) having been output from the external connection terminal 27 of the touch panel 23 and converts the signal to a digital signal to output. In other words, the signal processing element electronically performs a predetermined process on information of the touch position detected by the detection processing circuit 26 of the touch panel 23. As described above, by employing a configuration of connecting the signal processing element to the touch panel 23, it is possible to realize electronic equipment such as a digitizer which has a touch-position detection function and which outputs information of the touch position detected by the detection processing circuit 26 of the touch panel 23 to an external signal processing device such as a computer.

Note that, the signal processing element may be built in (mounted on) the controller substrate 25 of the touch panel 23. In this case, if the signal processing element is equipped with an output function satisfying a bus standard such as USB (Universal Serial Bus), it is possible to realize electronic equipment having a highly versatile touch-position detection function.

In view of the above, according to the present fifth preferred embodiment, it is possible to obtain electronic equipment having a touch-position detection function having a projected capacitance touch panel in which deterioration in contrast is reduced and which has excellent visibility.

While the invention has been shown and described in detail, the foregoing description is in all aspects illustrative and not restrictive. It is therefore understood that numerous modifications and variations can be devised without departing from the scope of the invention.

What is claimed is:
1. A touch screen comprising:
a substrate;

a plurality of row-direction wirings and a plurality of column-direction wirings both provided on said substrate such that said row-direction wirings and said column-direction wirings cross in a stereoscopic view each other via an insulating film therebetween;

a plurality of lead-out wirings each provided to be electrically extended from each of first ends of said row-direction wirings and said column-direction wirings; and a first shield wiring provided to surround in a planar view said row-direction wirings, said column-direction wirings, and said lead-out wirings, wherein each of said row-direction wirings, each of said column-direction wirings, and said first shield wiring include comb-teeth parts formed to have comb-teeth shapes such that distances from said first shield wiring to said row-direction wiring and said column-direction wiring are small at predetermined parts, said comb-teeth parts are formed on a second end, of each of said row-direction wirings, on a second end of each of said column-direction wirings, and are formed on said first shield wiring, said comb-teeth parts formed on said second ends of each of said row-direction wirings and on each of said column-direction wirings and said comb-teeth parts formed on said first shield wiring are disposed to face each other in a planar view, and said comb-teeth parts formed on said second end of each of said row-direction wirings and on said second end of each of said column-direction wirings and said comb-teeth parts formed on said first shield wiring have therebetween capacitances of 1 pF or more.

2. The touch screen of claim 1, further comprising:

a second shield wiring branched off from said first shield wiring and disposed along said first ends of said row-direction wirings;

wherein one column-direction wiring which is of said column-direction wirings and is disposed closest to said first ends of said row-direction wirings further comprises a plurality of extension parts which are extendingly provided alternately, in a planar view, with said first ends of said row-direction wirings, and said second shield wiring and each of said extension parts each include comb-teeth parts formed to have a comb-teeth shape such that mutual distances between said second shield wiring and said extension part are small.

3. The touch screen of claim 2, wherein said comb-teeth parts are formed on a side, of each of said extension parts, facing said second shield wiring, and are formed on said second shield wiring, and said comb-teeth parts formed on said side, of each of said extension parts, facing said second shield wiring and said comb-teeth parts formed on said second shield wiring are disposed to face each other in a planar view.

4. The touch screen of claim 3, wherein said comb-teeth parts formed on said side, of each of said extension parts, facing said second shield wiring and said comb-teeth parts formed on said second shield wiring are disposed alternately with and apart from each other in a planar view.

5. The touch screen of claim 2, wherein said comb-teeth parts formed on said side, of each of said extension parts, facing said second shield wiring and each of said comb-teeth parts formed on said second shield wiring have therebetween a capacitance of 1 pF or more.

6. The touch screen of claim 1, wherein said comb-teeth parts formed on said second end of each of said row-direction wirings and on said second end on each of said column-direction wirings and said comb-teeth parts formed on said first shield wiring are disposed alternately and apart from each other in a planar view.

7. The touch screen of claim 1, wherein longer wirings of said row-direction wirings and said column-direction wirings are formed on a layer different from a layer on which said first shield wiring is formed, and said comb-teeth parts formed on said second ends of said longer wirings and said comb-teeth parts formed on said first shield wiring overlap each other in a planar view.

8. A touch panel comprising:

a touch screen of claim 1; and a touch-position detection circuit configured to detect a position, on said touch screen, pointed by a pointing body, based on a capacitance between said pointing body for pointing on said touch screen and said row-direction wiring and said column-direction wiring.

9. A display comprising:

a touch panel of claim 8; and a display element provided on a side, of said touch panel, opposite to a side on which pointing is performed on said touch screen, said display element being capable of displaying information.

10. An electronic equipment comprising:

a touch panel of claim 8; and an electronic processor configured to perform electronically a predetermined process on information of said position detected by said touch-position detection circuit of said touch panel.

* * * * *